(12) United States Patent
Carney et al.

(10) Patent No.: US 7,752,585 B2
(45) Date of Patent: Jul. 6, 2010

(54) METHOD, APPARATUS, AND COMPUTER PROGRAM PRODUCT FOR STALE NDR DETECTION

(75) Inventors: Christopher M. Carney, Red Hook, NY (US); Vern A. Victoria, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 436 days.

(21) Appl. No.: 11/872,183

(22) Filed: Oct. 15, 2007

(65) Prior Publication Data
US 2009/0100395 A1 Apr. 16, 2009

(51) Int. Cl.
*G06F 17/50* (2006.01)
(52) U.S. Cl. ............................................. 716/6; 703/16
(58) Field of Classification Search ............... 716/6; 703/16
See application file for complete search history.

(56) References Cited

U.S. PATENT DOCUMENTS

| | | | | |
|---|---|---|---|---|
| 5,452,239 A * | 9/1995 | Dai et al. | | 703/19 |
| 5,796,993 A | 8/1998 | Maguire | | |
| 6,457,159 B1 | 9/2002 | Yalcin | | |
| 6,691,301 B2 * | 2/2004 | Bowen | | 717/114 |
| 6,789,232 B1 | 9/2004 | Iyer | | |
| 7,111,275 B2 * | 9/2006 | Chen et al. | | 716/18 |
| 7,131,080 B2 * | 10/2006 | Chen et al. | | 716/4 |
| 2003/0140324 A1 | 7/2003 | Yalcin | | |
| 2004/0199889 A1 * | 10/2004 | Earnshaw et al. | | 716/6 |
| 2005/0050489 A1 * | 3/2005 | Chen et al. | | 716/4 |
| 2008/0249758 A1 * | 10/2008 | Gabele et al. | | 703/14 |
| 2009/0031268 A1 * | 1/2009 | Miranda et al. | | 716/6 |

FOREIGN PATENT DOCUMENTS

WO WO/2006/102027 A1 9/2006

OTHER PUBLICATIONS

Toyoda et al., "A Fully Integrated Characterization and Management System for ASIC Libraries", Proceedings of Fifth Annual IEEE International ASIC Conference and Exhibit, Sep. 21-25, 1992, pp. 245-248.*

* cited by examiner

*Primary Examiner*—Phallaka Kik
(74) *Attorney, Agent, or Firm*—William A. Kinnaman, Jr.

(57) ABSTRACT

Best and most recent NDR types are selected for all RLM's in a design in order to achieve timing closure. The selection employed uses two levels of filtering to examine the NDR types for each RLM, and based on the outcome of the filtering selects the most appropriate NDR type for input to the timing analysis. In one arrangement, the selection scheme is completely automated and is performed at the beginning of a timing analysis via script-driven processes.

20 Claims, 6 Drawing Sheets

METHOD, APPARATUS, AND COMPUTER PROGRAM PRODUCT FOR STALE NDR DETECTION

IBM® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

1. Field of the Invention

This invention relates to producing an integrated circuit ("IC") device, particularly with regard to modeling parameters of an electronic sub-component block in the IC device, and particularly with regard to selecting among electrical properties and timing delays for many sub-components in a dynamic design environment in order to ensure accuracy for a top-level timing analysis.

2. Description of Background

In IC's, particularly in complex IC's such as for SMP computers like IBM® zSeries® mainframe computer systems manufactured by IBM, it is common to partition the IC into entities having a logical hierarchy. Many logical entities of the IC are included in a hierarchy of entities that are considered in the timing analysis process. Random logic macros ("RLM's," also referred to simply as "macros") are a major one of them. They typically include anywhere from a few hundred to several thousand leaf cells (also referred to as "elements"), such as combinatorial logic gates and latches.

The prior art shown in FIG. 1 illustrates an IC chip 110, including macros 120, which include leaf cells 130. A process of producing an IC chip 110 may include a design process, wherein leaf cells 130, macros 120 and the chip 110 are defined as logical entities in a hierarchical representation of chip 110. In this context, it is necessary to perform a detailed timing analysis at the top-most level of the design and at all sub-level hierarchical boundaries to ensure the machine will function at the desired frequency in order to meet the performance objectives. Numerous processes lead up to timing analysis. One such process, known a "synthesis," produces logical and physical (placement information) data for all the leaf cells in each RLM. This is done by running a heuristical synthesis tool on a representation of the RLM logic, which is typically a textual representation in the form of VHDL.

Once an RLM is synthesized, which produces a logical and physical representation for all its leaf cells, then the RLM's electrical parameters, like capacitance, resistance and inductance, are modeled at every point in the macro in schematic fashion. In addition, timing data such as gate propagation delay, wire delay, and phase information is also then extracted at every point. A set of output files is produced by each these processes and is referred to as a nominal delay rule (NDR). Any one of these NDR's for each macro can then be used in an overall timing analysis process, which is a process that takes into account a combination of many macros.

Aspects of the above are shown in FIG. 2, which illustrates a series of processes 202, 204, and 206 for designing an IC chip 110 (FIG. 1), according to the prior art. Processes 202, 204, and 206 produce respective NDR's 210, 212 and 214 of corresponding types. That is, as shown in the illustrated instance, synthesizing process 202 receives a logical representation 201 of an RLM MACRO_1 in a VHDL format, which is a text based format, and responsively produces a logical and physical representation 203 and delay based NDR's 210, which are well-known data structures in the form of files for use in timing analysis that represent timing related aspects of logical and physical representation 203. Then, modeling process 204 receives logical and physical representation 203 and responsively produces a schematic electrical representation 205 of MACRCO_1 and also produces schematic based NDR's 212, which are well-known data structures in the form of files for use in timing analysis that represent, certain timing related, aspects of schematic electrical representation 205. Then, extraction process 206 receives electrical representation 205 and responsively produces a physical electrical representation 207, which includes physical wire and silicon aspects, also responsively produces extraction based NDR's 214, which are well-known data structures in the form of files for use its timing analysis that represent certain timing related aspects of physical electrical representation 207.

As shown in FIG. 2, processes 202, 204, and 206 are, likewise, performed for MACRO_2, MACRO_3, etc., so that they producing corresponding NDR's 210, 212, and 214 for each one of the RLM's MACRO_1, MACRO_2 and MACRO_3. FIG. 2 also illustrates the use of NDR's 210, 212 and 214 in a timing analysis process 250, which produces overall chip 110 level timing results. As previously explained, any one of the NDR's 210, 212 and 214 may be used for each macro as timing analysis 250 input 240. Therefore, selections must occur. As shown, NDR's 214 are selected in all cases according to the illustrated prior art prior art selection process.

FIG. 3 illustrates a prior art NDR selection process 310, which is one of the sub processes in an overall design process for an IC chip 110 (FIG. 1). An RLM NDR library serves as the main input to the NDR selection process 310 that is run at the beginning of the timing analysis. From the library comes three type of NDR's: 1) extraction based 214, 2) schematic based 212, and 3) delay rule based 210. All three types of NDR's often exist for every RLM in the library. In the instance illustrated in FIG. 2, this is the case.

Process 305 locates the NDR's by type. The NDR types enter the selection process 310 by type, as shown, and a determination is made as to which NDR to select for each RLM, based on established rules. The rules are: 1) select extracted NDR 214, if present; 2) if extracted NDR 214 is not present, then select schematic NDR 212, and, finally, 3) if neither extracted NDR 214 nor schematic NDR 212 are present, then default to a delay based NDR 210. The NDR selected for each RLM is used as input 240 to the main timing analysis. All NDR types for a RLM that are not selected are discarded.

Thus, applying process 310 shown in FIG. 3 to the illustrated instance of FIG. 2, since extraction based NDR's 214 exist for RLM MACRO_1, and also exist (although are not explicitly illustrated) for MACRO_2 and MACRO_3, the NDR's selected by process 310 are all NDR's 214, as shown for input 240.

A conventional procedure for selecting the most appropriate NDR for each ELM is to preferably select an NDR that is modeled from extracted data, since that kind of NDR incorporates real wire delays and parasitics, and thus maintains the highest degree of accuracy over all other forms. The next preferred NDR is conventionally one modeled after schematic data, which includes an estimate on she wire delays and parasitics, but still has a high degree of accuracy on the physical placement and delays of the leaf cells in the circuit. The least preferred is conventionally the NDR modeled after delay statements, which include no physical gate placement or wire data at all.

SUMMARY OF THE INVENTION

The present invention involves a recognition that the conventional process for selecting NDR's is problematic, particularly for large designs and in dynamic environments, at least because the conventional process ignores integrity of each NDR type and also ignores NDR generation dates. Provided that at the time of their selection, all NDR's are updated in all respects, so that they each reflect, all the latest design features and parameters for each of their respective RLM's, the prior art scheme ensures the highest degree of accuracy for timing analysis by always selecting an extracted NDR type when available, which provides detailed wire modeling information. However, for a large scale design this is highly unlikely, due to many complications presented by the design scale and the dynamic design environment.

The present invention addresses these problems. In one form of the invention, for a method in an integrated circuit ("IC") device design process, the IC device has entities related to one another in a logical hierarchy. Design production processes executed by a computer system produce representations of the respective entities and delay-definition data structures for the respective entities. According to the method, ones of the data structures are selected, wherein the data structures are for inputting to a timing analysis process. The selecting includes finding, by a first process executing on a computer system, the delay-definition data structures for the entities. Also, the selecting includes receiving data structures found by the first process and checking the data structures for missing or corrupted components by a second process executing on the computer system. The checking rejects data structures having missing or corrupted components. Also, the selecting includes receiving non-rejected data structures from the second process and selecting, by a third process executing on the computer system, from among the received, non-rejected data structures, a data structure with a most recent compile date for each respective entity. The selected ones of the non-eliminated data structures are provided to the timing analysis process for timing performance of the entity representations at hierarchical boundaries to determine whether the entities will function together at a desired frequency.

In another aspect, the timing analysis process executes on the computer system, and the first, second and third processes are executed at runtime inside the timing analysts process.

In another aspect, the design production processes are of respective predetermined types and the finding finds the delay-definition data structures for the entities independently of the type of design production processes.

In another aspect, the data structures each include a set of files and the checking of the received data structures for missing or corrupted components includes checking for a predetermined type of file in each set.

In another aspect, the method includes storing a record indicating the data structure has missing or corrupted files if the predetermined type of file is missing.

In another aspect, the relating to one another in a logical hierarchy includes the entities being associated with respective levels within the logical hierarchy and the finding includes finding the delay-definition data structures for each of the entities of a certain one of the hierarchy levels.

System and computer program products corresponding to the above-summarized methods are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

TECHNICAL EFFECTS

The invention technically achieves a way of producing an IC chip that is more accurate, more dependable, and simpler to manage. The inherent problems associated with stale or outdated NDR's is eliminated through an automatic selection algorithm that always selects the most chronologically recent NDR, allowing more rapid design progress to transpire. In addition, corrupted or missing NPR's are discarded, which ensures no potentially critical timing paths are hidden for the subsequent timing analysis.

BRIEF DESCRIPTION OF THE DRAWINGS

The subject matter regarded as the invention is particularly pointed out and distinctly claimed in the claims at the conclusion of the specification. The foregoing and other objects, features, and advantages of the invention are apparent from the following detailed description taken in conjunction with the accompanying drawings in which:

Figure 1:
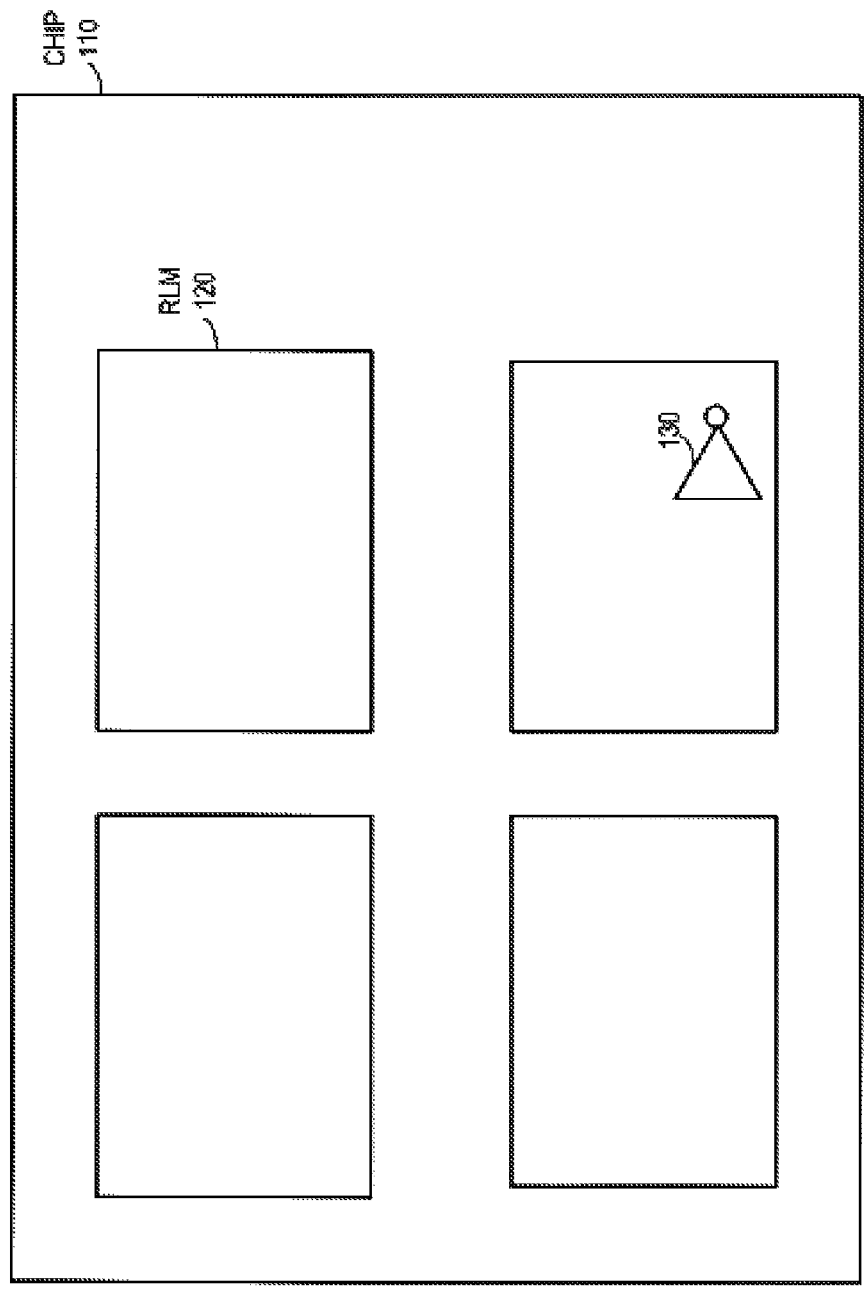
FIG. 1 illustrates an IC chip, including macro and leaf cell entities, according to the prior art.

The detailed description explains preferred embodiments of the invention, together with advantages and features, by way of example with reference to the drawings.

DETAILED DESCRIPTION OF THE INVENTION

In the following detailed description of the preferred embodiments, reference is made to the accompanying drawings illustrating embodiments in which the invention, may be practiced. It should be understood that other embodiments may be utilized and changes may be made without departing from the scope of the present invention. The drawings and detailed description are not intended to limit the invention to the particular form disclosed. On the contrary, the intention is to cover all modifications, equivalents and alternatives falling within the spirit and scope of the present invention as defined by the appended claims. Headings herein are not intended to limit the subject matter in any way.

The chip design process or processes described herein may be implemented by logic in the form of instructions executing on a computer system (also referred to as a "data processing system"), or entirely in the form of hardware, or in an embodiment containing both hardware and software elements. Application specific integrated circuitry is another example of hardware.

Note that the hierarchical classifications of logical entitle described herein are not necessarily related in terms of when the entities arose during the design process for a chip. Rather, it should be merely be understood that the end result of a chip design process is a structure in which a parent chip contains, or at least has associated with, children units that are in a sense placed thereon. Likewise, the children units contain, or at least are associated with, respective grandchildren macros that are in a sense placed on respective units.

Note also that the hierarchical classifications are not necessarily fixed throughout the entire chip. That is, in a first portion of a chip, a unit may be a child of the chip, while in a second portion, a core may be a child of the chip and a unit may be a child of the core, for example. Thus, in the second portion of the chip, an entity classified as a unit is grandchild of the chip, but in the first portion, an entity classified as a unit is a child of the chip.

It should be also understood that just as the hierarchical classifications are not necessarily fixed throughout the entire chip, likewise, the way in which logical entities are defined is not necessarily fixed throughout an entire logical entity. That is, a first part of it logic entity may be defined in a first manner, which uses a first set of terms, and a second part of the same entity may be defined in a different manner, which uses a second set of terms, where the first and second sets of terms define their portions of the chip at different levels of abstraction.

As explained herein above, timing analysis presents many difficulties. To further elaborate, a first difficulty arises because the IC design includes many RLM's produced by many different people using, many different tools. Further, timing analysis is not simply performed once after the designs of all these RLM's have been finished. Far from it. Timing analysis may be, instead, performed throughout the course of the design process, while the logic of each of these RLM's is still subject to frequent change.

Figure 2:
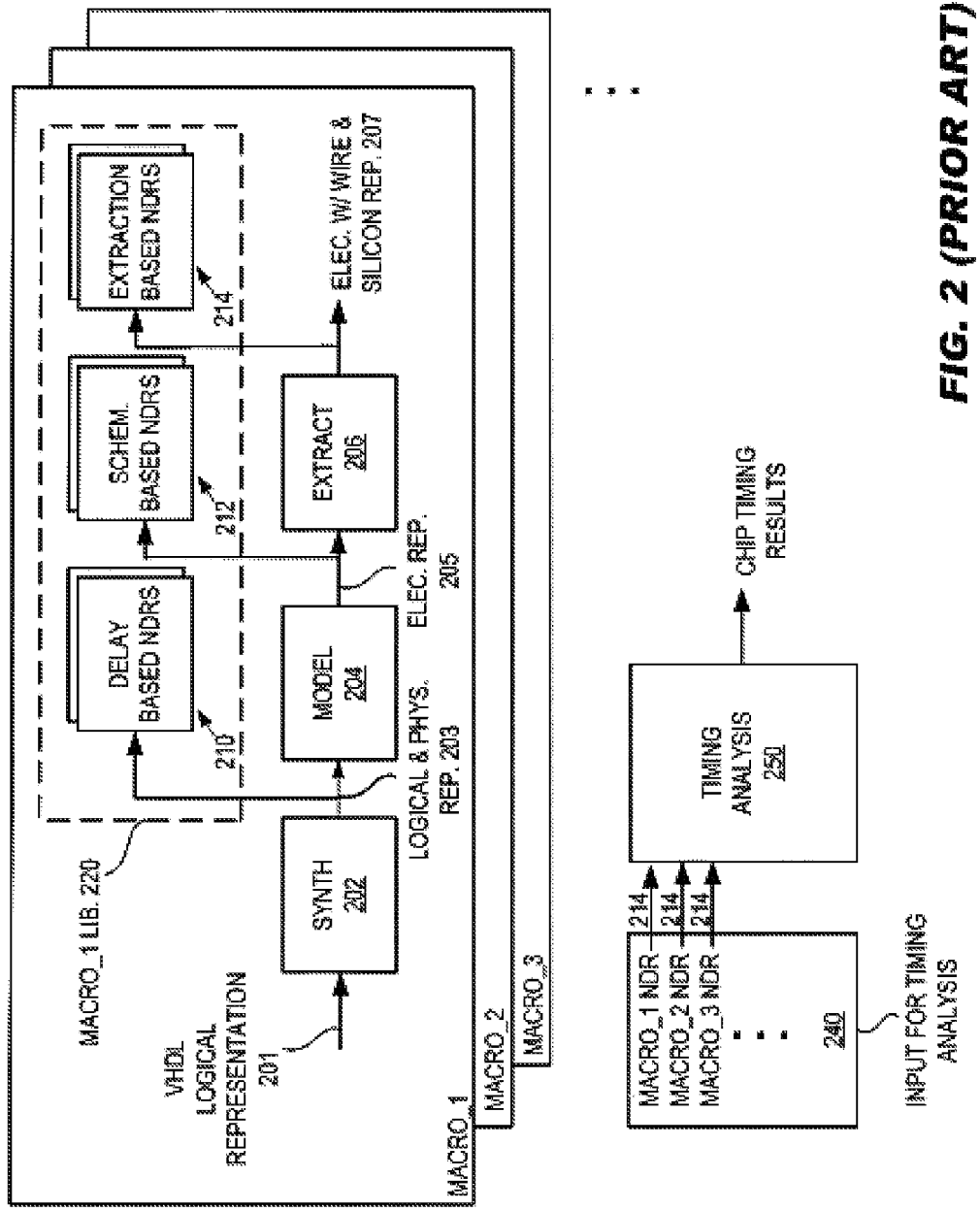
FIG. 2 illustrates a series of design processes for producing an IC chip, according to the prior art.
Figure 3:
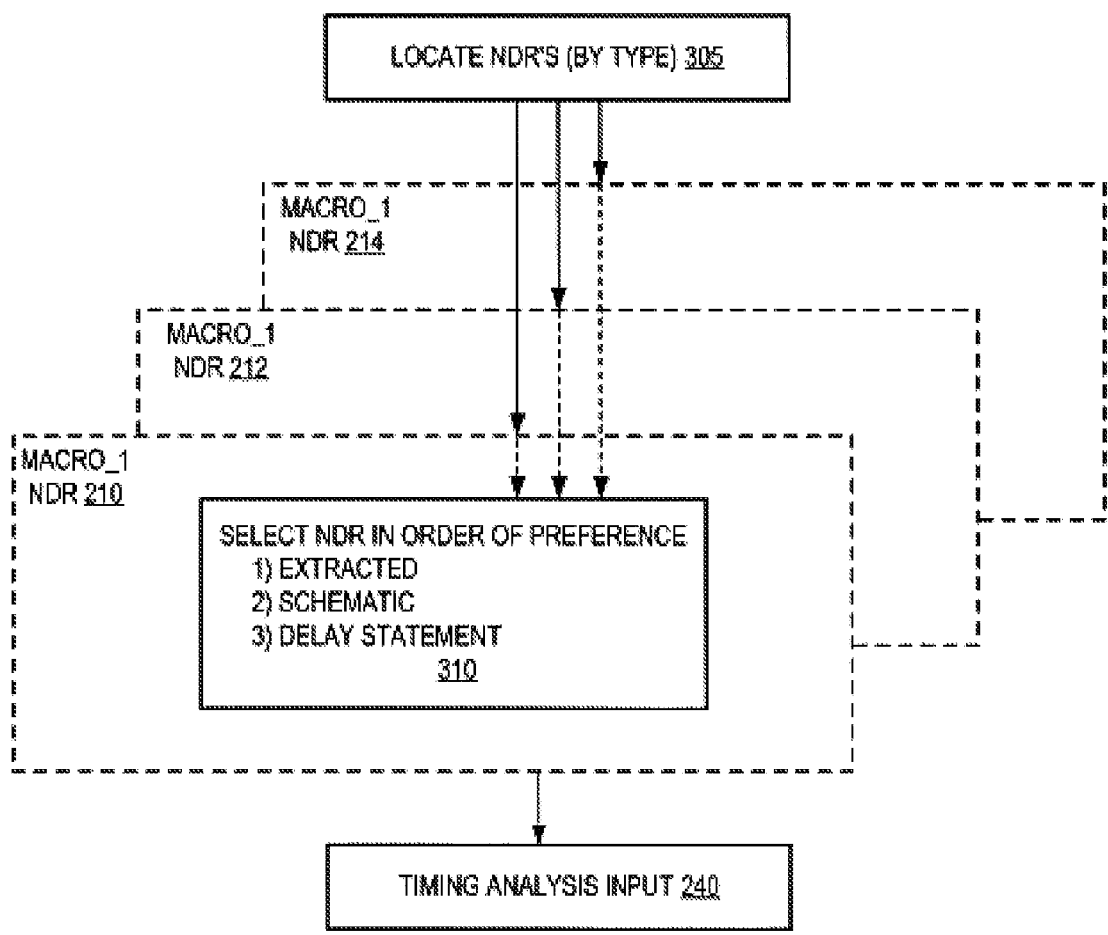
FIG. 3 illustrates a prior art NDR selection scheme used in a design process for producing an IC chip.

To complicate matters even further, it is not just an RLM's logic that frequently changes during the design process. There are different representations 201, 203, 205, 207, etc. of an RLM presenting different levels of detail, as explained regarding FIG. 2 above. Further, these may arise at various times during the design process and may also be subject to frequent change. Consequently, more than one NDR is produced during the design process for any one particular RLM, such as NDR's 210, 212 and 214 of FIG. 2. In summary, for each RLM there may be quite a number of NDR's produced at different times according to different data representations. Conventionally, someone controlling or initiating the timing analysis 250 decides which data representation is best for his/her application for each RLM.

To cite one specific example, schematic NPR's are typically available much sooner than extracted NDR's. So when, the logical representation for a RLM changes, as it may frequently do, a schematic NDR for the RLM may be more up to date than an extracted NDR. Due to the logic change, it may be desired to analyze overall timing. The conventional procedure, as described above, will always select the extracted NDR, if present, thereby missing the opportunity to see any potential change to the rest of the design. Operating in such a fashion with a large number of RLM's changing frequently can potentially harm project schedules.

Figure 4:
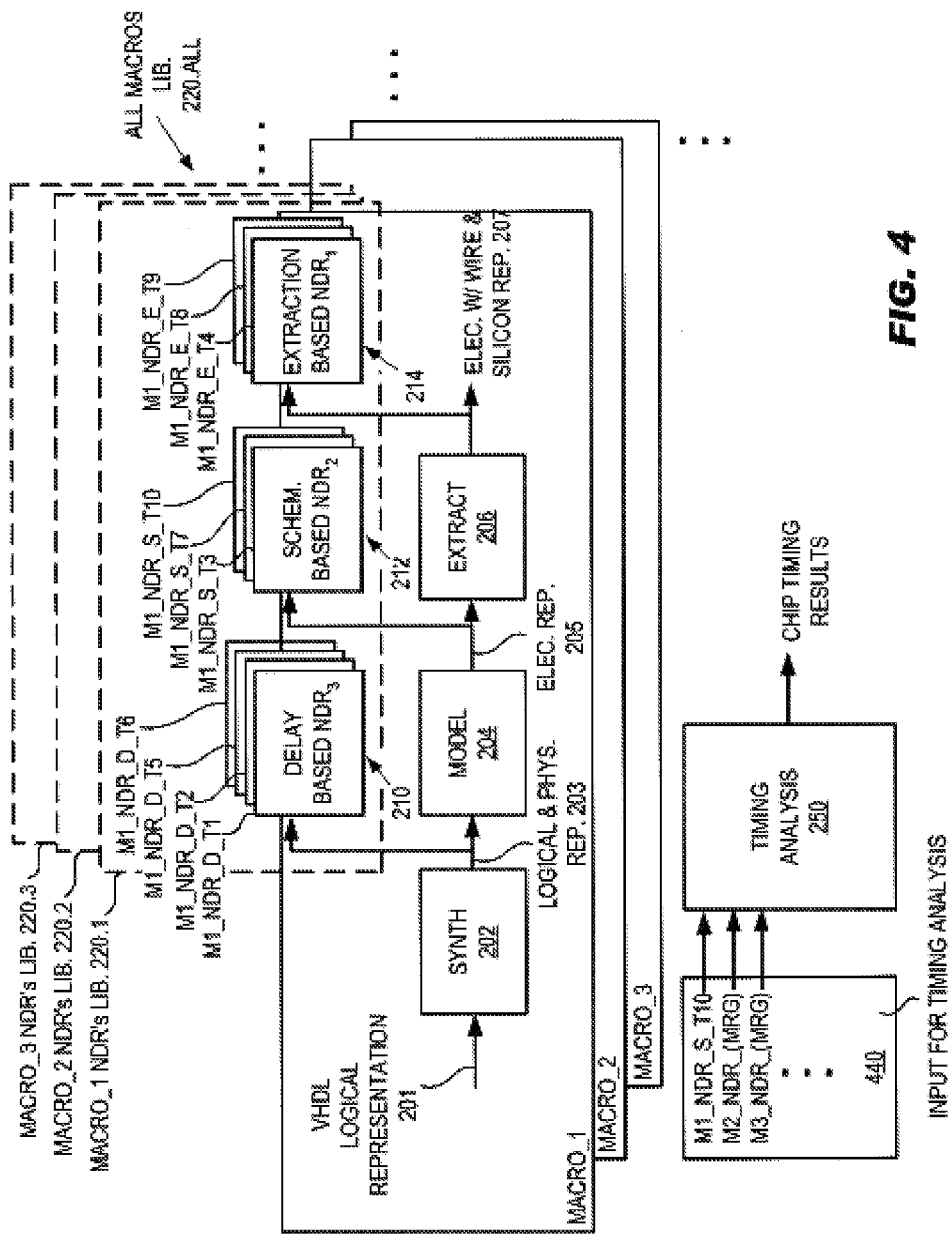
FIG. 4 illustrates, according to an embodiment of the present invention in the context of the series of design processes for producing an IC chip, outputs of die herein disclosed NDR selection scheme, which provide input to a timing analysis process.
Figure 5:
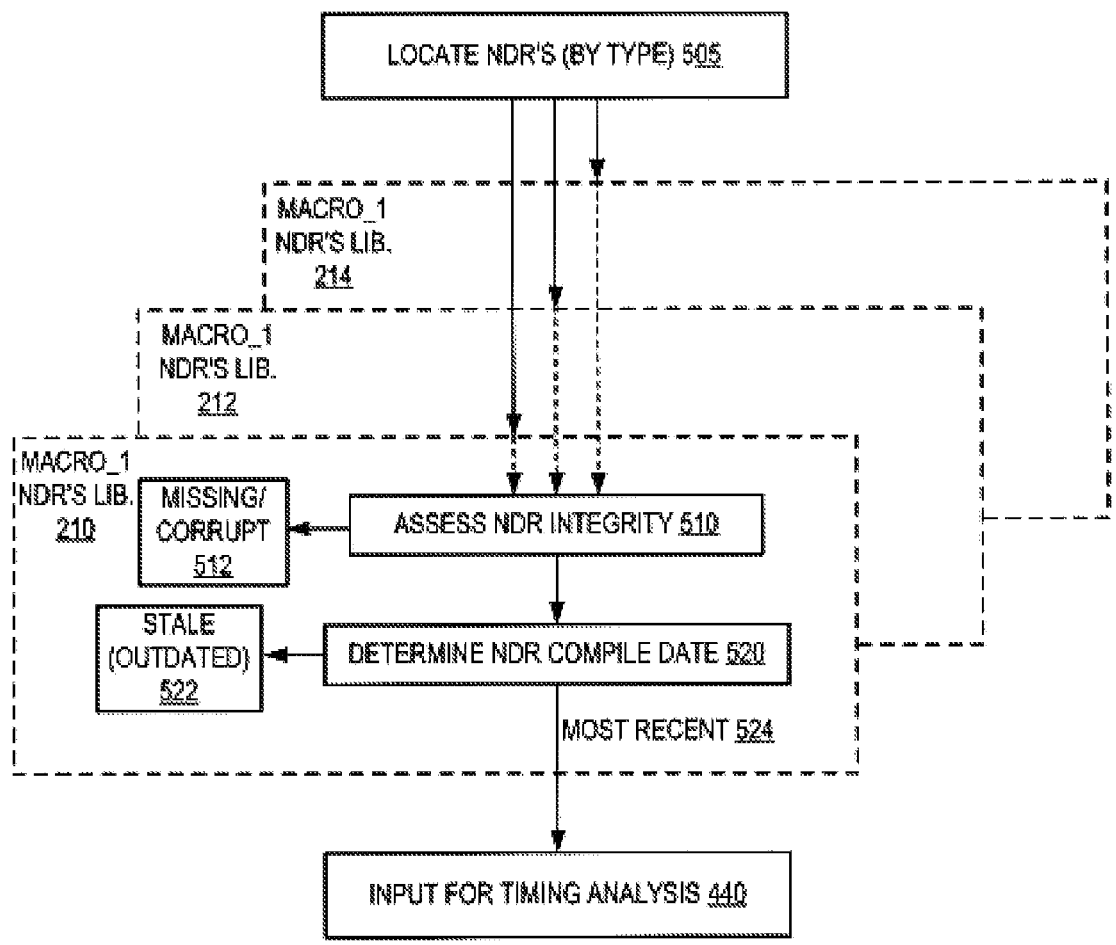
FIG. 5 illustrates NDR selection processes used in a design process for producing an IC chip, according to an embodiment of the present invention.

Aspects of the present invention are summarized herein above. Turning now to drawings of an embodiment of the present invention, for greater detail, FIG. 4, depicts outputs 440 of NDR generation processes, in the context of the series of design processes 202, 204, 206 and 250 for producing an IC chip 110 (FIG. 1). In the context of a hierarchical design having levels of design hierarchy (parent, child, etc.), FIG. 5 shows steps performed by a computer process 500 at the child level, according to an embodiment of the invention. That is, process 500, which may be referred to herein as NDR selectors process 500, arises, tram execution, of a computer program by a computer system, which may be a subprogram of a larger program. Process 500 may include subprocesses and may itself be a subprocess. It should be understood that reference herein to a process performing some function is intended to encompass a situation in which the process is a subprocess. Likewise, reference herein to a process performing some function is intended to encompass a situation in which a subprocess of the process performs the function.

With reference again to FIG. 4, outputs 440 provide input to timing analysis process 250. Processes 202, 204, and 206 produce respective NDR's 210, 212 and 214 of corresponding types for each macro MACRO_1, MACRO_2, and MACRO_3, as previously described regarding FIG. 2. As shown in the illustrated embodiment of FIG. 4, the NDR's 210, 212 and 214 for MACRO_1 are stored in a MACRO_1 NDR library 220.1 the NDR's 210, 212 and 214 for MACRO_2 are stored in a MACRO_2 NDR library 220.2, the NDR's 210, 212 and 214 for MACRO_3 are stored in a MACRO_3 NDR library 220.3, etc. These libraries are collectively referred to in FIG. 4 as library 220.ALL.

Processes 202, 204, and 206 produce respective NDR's 210, 212 and 214 repeatedly, i.e., at various times and for various different versions of many macros of the chip. Accordingly, in the illustrated embodiment of FIG. 4, various types of NDR's are explicitly shown for macro MACRO_1, i.e., NDR's 210, NDR's 212 and NDR's 214. Also, various versions of each of these types of NDR's are shown in FIG. 4. That is, for NDR's 210 for macro MACRO_1 four NDR's are shown in the illustrated instance, i.e., M1_NDR_T1, M1_NDR_D_T2, M1_NDR_D_T5, M1_NDR_D_T6.

In the illustrated Instance, properties of the NDR's 210, 212 and 214 are indicated by parts of their respective names, i.e., associated macro by "M" prefix, NDR type by particular predefined characters ("D" for delay based, "$" for schematic based, and "E" for extraction based), and the times they were respectively generated by numbers juxtaposed with respective "T" suffixes, such as "T1" for an NDR created at time T1, which is earlier than a time T2, etc. It should be understood by reference to FIG. 4 that in the illustrated instance the last generated NDR shown for macro MACRO_1 is a schematic based NDR 212, specifically, NDR M1_NDR_S_T10. Consequently, this NDR M1_NDR_S_T10 is shown having been selected for inclusion as input 440 for timing analysis process 250. The NDR's selected for macros MACRO_2 and MACRO_3 are shown as M2_NDR_(MRG) and M3_NDR_(MRG) to indicate they are the "most recent good" NDR's for their respective macros.

With reference again to FIG. 5, NDR selection process 500, includes processes 505, 510 and 520, according to an embodiment of the present invention. An algorithm implemented by process 500 is applied at the top-most level of the design to be timed, and automatically selects the most recent NDR for every RLM in the design. The net effect is that every timing analysis performed reflects the most recent logical updates to the design, allowing the propagation effects to be analyzed and fed back to the relevant personnel for either further updates or analysis, with only a small loss of modeling accuracy for those RLM's whose more recent schematic NDR's were selected over their less recent extracted versions.

More specifically, Process 505 locates the existing NDR's for each RLM, which may include three NDR types, in the illustrated embodiment. This includes process 505 searching libraries 210, 212 and 214 for all NDR's, not just by type.

Also, Process 500 also includes two additional filter processes 510 and 520 for selecting an NDR.

Filter process 510 checks for missing or corrupt NDR's, and if it finds one then discards it appropriately, i.e., rejects it for use in timing analysis. Process 510 detects this by checking to make sure all NDR files are present in a set of files that constitute an NDR. In one embodiment of the invention, the last file that is written out by processes such as processes 202, 204 and 206 in connection with a run that generates NDR's, is a file called "bomFile." Process 510 checks for the existence of this file in each set of files that constitute an NDR. Empirical results have shown that if this file is there, it can be generally be concluded that all the files of the NDR are there. However, if this file is missing, then all the files of the NDR that are needed for timing analysis process 250 are usually not there, and the NDR produced by that run is therefore excluded from consideration.

Further, even if all the needed files are there, if the bomFile is missing, this provides no guarantee as to the integrity of the NDR. So also for this reason process 510 excludes the NDR from farther consideration if the bomFile is missing. Process 510 may also store a record indicating the NDR has missing or corrupted files if the bomFile is missing.

Process 520 then receives the NDR's that not rejected by the filtering, i.e., that are selected, by process 510. Process 520 then, selects from among the non-rejected NDR's the NDR of the type with the most recent compile date, to guarantee the chip-level timing results generated by timing analysis process 250 uses the most up-to-date input 440 reflecting the most up-to-date macro logic as possible. That is, process 520 rejects less recent NDR's from inclusion as input 440.

It should be appreciated that the selection scheme as shown in FIGS. 4 and 5 provides two levels of filtering 510 and 520 that are absent from the above described prior art selection scheme. The processes for selecting the best NDR for each macro in accordance with the embodiments of the invention described herein do not suffer from disadvantages mentioned previously, and additionally offer important advantages. The process 520 always selects the most chronologically recent NDR, as determined by its generation or compile date.

In one embodiment of the invention, an exception to the above described selection occurs in the case of a corrupted or missing NDR, as determined by process 510. At times NDR generation can incur errors, thus affecting the integrity or even the viable completion of the modeling analysis. This can happen as the result of insufficient batch resources or due to machine memory failures in a parallel networked computer environment. In such events, process 510 discards such NDR's and selects the next appropriate one, thus providing a notable advantage over tire established procedure. This is extremely important, since a missing or corrupted NDR has the unfortunate side effect of omitting timing for its associated portion of the design, and any part connected to it. This can mask potentially critical timing paths that may impair the progress and overall maturation of the design.

Note also, regarding process 520, that should a extracted NDR and schematic NDR have the same compile date for a RLM, then process 520 selects the extracted NDR, since presumably it will provide more accurate modeling due to the inclusion of detailed wiring and parasitics.

Process 500 thus performs two duties simultaneously, i.e., selecting the most recent NDR for every RLM in a system, while deselecting any corrupted NDR's that may mask critical timing paths during a timing analysis. In the rare event that all NDR types are bad (missing or incomplete) for a particular macro, then process 500 will do no better or worse than the standard all-or-nothing selection scheme, resulting in a model build error for that macro.

In one embodiment of the present invention, the NDR selection process 500 is performed automatically via a script executed at runtime inside the main timing process. This is to eliminate any human error that may be introduced should the user forget to run the process before executing the timing analysis. It is not practical in a large scale design for process 500 to be applied manually for each RLM in the design, because that would take tar more time and be prone to substantial error. The automation of process 500 ensures the highest degree of accuracy in the data being modeled in the shortest amount of time.

Process 500 is described herein above in terms of one level of hierarchy, which in the embodiment described as illustrated as being macros. Multiple levels of hierarchy can be supported simply by invoking the process 500 one for each level in the design.

Process 500 is also a suitable tool for analyzing NDR compile problems, computer network issues, or other system environment problems as pertains to the generation of NDR's. A high amount of discarded NDR's by algorithm 500 may be used as a signal that one of the above mentioned issues needs to be investigated.

System and computer program products corresponding to the above-summarized methods are also described and claimed herein.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams and data structures depicted herein are just examples. There may be many variations to these structures, diagrams or steps (or operations) described without departing from the spirit of the invention. For instance, the steps may be performed in a differing order, or steps may be added, deleted or modified. All of these variations are considered a part of the claimed invention.

Computer Program Product

The present invention, aspects of which are shown in the above FIG's, may be distributed in the form of instructions, which may include data structures and may be referred to as a "computer program," "program," "program, code," "software," "computer software," "resident software," "firmware," "microcode," etc. Stored on a computer-readable storage medium, such instructions and storage medium may be referred to as a "computer program product," "program product," etc.

The computer program product may be accessible from a computer-readable storage medium providing program code for use by or in connection with a computer or any instruction execution system. The present invention applies equally regardless of the particular type of media actually used to carry out the distribution. The instructions are read from the computer-readable storage medium by an electronic, magnetic, optical, electromagnetic or infrared signal. Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD. The instructions may also be distributed by digital and analog communications links, referred to as "transmission media."

Computer System

A data processing system suitable for storing and/or executing program code includes at least one processor coupled directly or indirectly to memory elements through a system bus. The memory elements can include local memory employed during actual execution of the program codes bulk storage and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Moderns, cable modem and Ethernet cards are just a few of the currently available types of network adapters.

Figure 6:
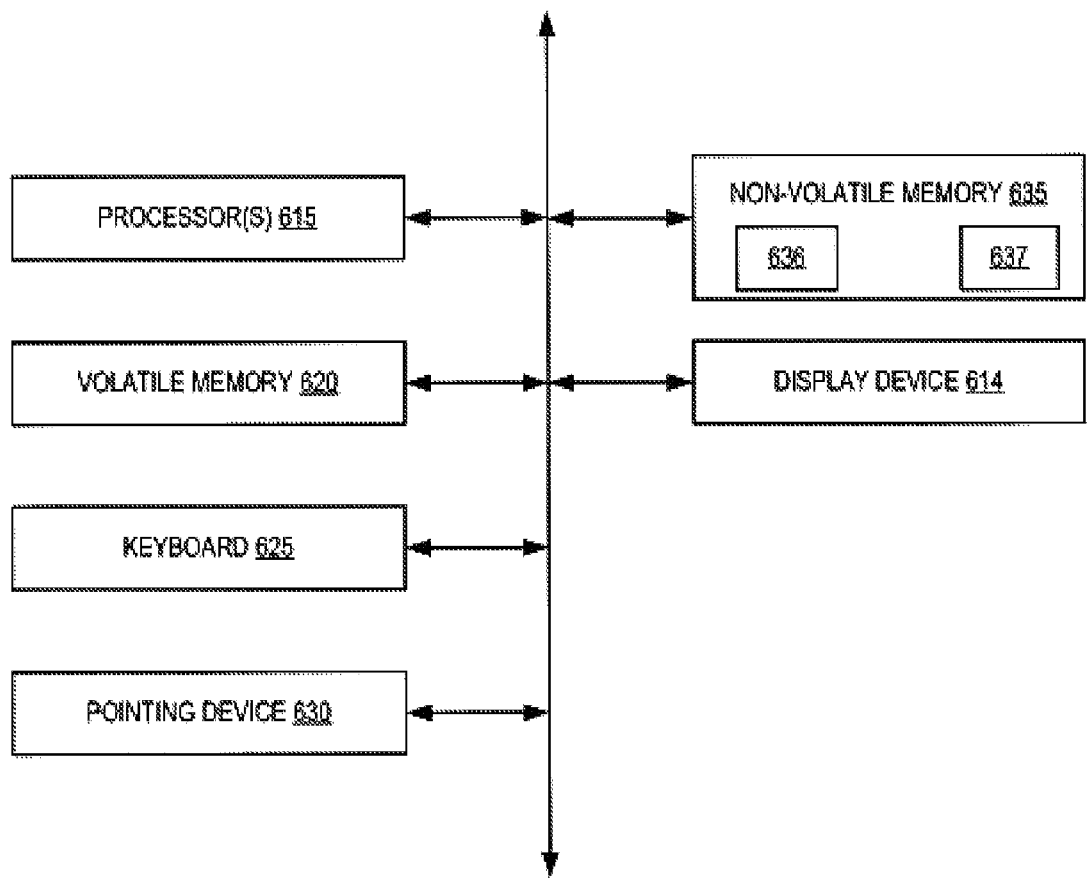
FIG. 6 illustrates a computer system having instructions to implement a method in accordance with and embodiment of the present invention.

Referring now to FIG. 6, a computer system 610 is illustrated, which may take a variety of forms, including a personal computer system, mainframe computer system workstation, server, etc. That is, it should be understood that the term "computer system" is intended to encompass any device having a processor that executes instructions from a memory medium. In the illustrated system embodiment, system 610 includes one or more processors 615, a keyboard 625, a pointing device 630, and tangible, computer-readable storage media, including volatile 620, and nonvolatile memory 635, e.g., ROM, hard disk, floppy disk, CD-ROM, and DVD, and display device 614.

Memory 635 of system 610 stores computer programs 636 (also known as "software programs"), wherein programs 636 include instructions that are executable by one or more processors 615 to implement various embodiments of a method in accordance with the present invention. Memory 635 of system 610 also has data 637 stored thereon that provides circuit structures, logical entity properties including physical locations, etc. Programs 636 include instructions for implementing the process 500 of FIG. 5, for example, as well as other processes describe herein.

Those of ordinary skill in the art will appreciate that the hardware in FIG. 6 may vary depending on the implementation. For example, other peripheral devices may be used in addition to or in place of the hardware depicted in FIG. 6. The depicted example is not meant to imply architectural limitations with respect to the present invention. Various embodiments of system 810 implement one or more software programs 636 and data 637 in various ways, including procedure-based techniques, component-based techniques, and/or object-oriented techniques, among others. Specific examples include XML, C, C++ objects, lava and commercial class libraries.

General Remarks

The terms "circuitry" and "memory" and the like are used herein. It should be understood that these terms refer to circuitry that is part of the design for an integrated circuit chip 110 FIG. 1. The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging tram toys and other low-end applications to advanced computer products having a display, a keyboard or other input device, and a central processor.

To reiterate, the embodiments were chosen and described in order to best explain the principles of the invention, the practical application, and to enable others of ordinary skill in the art to understand the invention. Various other embodiments having various modifications may be suited to a particular use contemplated, but may be within the scope of the present invention.

For example, the names of NDR's 210, 212 and 214 shown in FIG. 4 are for simplicity of illustration. It should be understood that actual file names of the stored NDR's 210, etc. will be formatted differently, according to conventions that are well-known in the art. It should also be understood that these properties may fee stored in a manner other than by including indicators for the properties in file names. For example, these properties may be included in other file related attributes that are accessible according to a well known file system feature of an operating system. It should also be understood that additional properties, besides those illustrated may also be associated with the files. For example, properties may include a name of a "run" used to identify particular executions of processes 202, etc. Properties may include version information relating to a particular representation of a macro, etc.

Unless clearly and explicitly stated, the claims that follow are not intended to imply any particular sequence of actions. The inclusion of labels, such as a), b), c) etc., for portions of the claims does not, by itself, imply airy particular sequence, but rather is merely to facilitate reference to the portions.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method for design of in an integrated circuit ("IC") device design process, wherein the IC device has entities related to one another in a logical hierarchy, wherein design production processes executed by a computer system produce representations of the respective entities and delay-definition data structures for the respective entities, the method comprising:

selecting ones of the data structures, wherein the data structures are for inputting to a timing analysis process, and wherein the selecting comprises:

finding, by a first process executing on a computer system, the delay-definition data structures for the entities;

receiving data structures found by the first process and checking the received data structures for missing or corrupted components by a second process executing on the computer system, wherein the checking rejects data structures having missing or corrupted components; and receiving non-rejected data structures from the second process and selecting, by a third process executing on the computer system, from among the received, non-rejected data structures, a data structure with a most recent compile date for each respective entity; and providing the selected ones of the non-eliminated data structures to the timing analysis process for timing performance of the entity representations at hierarchical boundaries to determine whether the entities will function together at a desired frequency.

2. The method of claim 1, wherein me timing analysis process executes on the computer system, and the first, second and third processes are executed at runtime inside the timing analysis process.

3. The method of claim 1, wherein the design production processes are of respective predetermined types and the finding finds the delay-definition data structures for the entities independently of the type of design production processes.

4. The method of claim 1, wherein the data structures each include a set of files and the checking of the received data structures for missing or corrupted components includes checking for a predetermined type of file in each set.

5. The method of claim 4, comprising:

storing a record indicating the data structure has missing or corrupted files if the predetermined type of file is missing.

6. The method of claim 1, wherein the relating to one another in a logical hierarchy includes the entities being associated with respective levels within the logical hierarchy and the finding includes finding the delay-definition data structures for each of the entities of a certain one of the hierarchy levels.

7. A computer system comprising:

a processor; and a storage device connected to the processor, wherein the storage device has stored thereon a program for controlling die processor for design of an integrated circuit ("IC") device, wherein the device has entities related to one another in a logical hierarchy, wherein design production, processes executed, by the computer system produce representations of the respective entities and delay-definition data structures for the respective entities, and wherein the processor is operative to execute instructions of the program to implement a method comprising the steps of:

selecting ones of the data structures, wherein the data structures are for inputting to a timing analysis process, and wherein the selecting comprises:

finding, by a first process executing on a computer system, the delay-definition data structures for the entities;

receiving data structures found by the first process and checking the received data structures for missing or corrupted components by a second process executing on the computer system, wherein the checking rejects data structures having missing or corrupted components; and receiving non-rejected data structures from the second process and selecting, by a third process executing on the computer system, from among the received, non-rejected data structures, a data structure with a most recent compile date for each respective entity; and providing the selected ones of the non-eliminated data structures to the timing analysis process for timing performance of the entity representations at hierarchical boundaries to determine whether the entities will function together at a desired frequency.

8. The system of claim 7, wherein the timing analysis process executes on the computer system, and the first, second and third processes are executed at runtime inside the timing analysis process.

9. The system of claim 7, wherein the design production processes are of respective predetermined types and die finding finds the delay-definition data structures for the entities independently of the type of design production processes.

10. The system of claim 7, wherein the data structures each include a set of files and the checking of the received data structures for missing or corrupted components includes checking for a predetermined type of file in each set.

11. The system of claim 10, wherein the method implemented by the processor executing instructions of the program farther comprises the step of:

storing a record indicating the data structure has missing or corrupted files if the predetermined type of file is missing.

12. The system of claim 7, wherein the relating to one another in a logical hierarchy includes the entities being associated with respective levels within the logical hierarchy and the finding includes finding the delay-definition data structures for each of the entities of a certain one of the hierarchy levels.

13. A computer program product, stored on a non-transitory computer readable medium, for design of an integrated circuit ("IC") device, wherein the device has entities related to one another in a logical hierarchy, wherein design production processes executed by a computer system produce representations of the respective entities and delay-definition data structures for the respective entities, the computer program product having instructions for execution by a computer, wherein the instructions, when executed by the computer, cause the computer to implement a method comprising the steps of:

selecting ones of the data structures, wherein the data structures are for inputting to a timing analysis process, and wherein the selecting comprises:

finding, by a first process executing on a computer system, the delay-definition data structures for the entities;

receiving data structures found by the first process and checking the received data structures for missing or corrupted components by a second process executing on the computer system, wherein the checking rejects data structures having missing or corrupted components; and receiving non-rejected data structures from the second process and selecting, by a third process executing on the computer system, from among the received, non-rejected data structures, a data structure with a most recent compile date for each respective entity; and providing the selected ones of the non-eliminated data structures to the timing analysis process for timing performance of the entity representations at hierarchical boundaries to determine whether the entities will function together at a desired frequency.

14. The computer program product of claim 13, wherein the timing analysis process executes on the computer system, and the first, second and third processes are executed at runtime inside the timing analysis process.

15. Use computer program product of claim 14, wherein the design production processes are of respective predetermined types and the finding finds the delay-definition data structures for the entities independently of the type of design production processes.

16. The computer program product of claim 15, wherein the data structures each include a set of files and the checking of the received data structures for missing or corrupted components includes checking for a predetermined type of file in each set.

17. The computer program product of claim 13, wherein the design production processes are of respective predetermined types and the finding finds the delay-definition data structures for the entities independently of the type of design production processes.

18. The computer program product of claim 13, wherein the data structures each include a set of files and the checking of the received data structures for missing or corrupted components includes checking for a predetermined type of the in each set.

19. The computer program product of claim 18, wherein the instructions, when executed by the computer, cause the method to further comprise the step of:

storing a record indicating the data structure has missing or corrupted files if the predetermined type of file is missing.

20. The computer program product of claim 13, wherein the relating to one another in a logical hierarchy includes the entities being associated with respective levels within the logical hierarchy and the finding includes finding the delay-definition data structures for each of the entities of a certain one of the hierarchy levels.

* * * * *